(12) United States Patent
Chouinard et al.

(10) Patent No.: US 9,075,959 B2
(45) Date of Patent: *Jul. 7, 2015

(54) APPLICATION BUILDER FOR INDUSTRIAL AUTOMATION

(75) Inventors: Julien Chouinard, Magog (CA); Gilles Brunet, St-Hubert (CA); Denis Lavallee, St-Constant (CA); Chan-Dara Trang, Brossard (CA); Jean-Francois Laliberte, Boucherville (CA); Frédéric Darveau, St-Hubert (CA); Olivier Larouche, Boucherville (CA)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/526,856

(22) Filed: Jun. 19, 2012

(65) Prior Publication Data

US 2012/0272215 A1    Oct. 25, 2012

Related U.S. Application Data

(63) Continuation of application No. 12/242,346, filed on Sep. 30, 2008, now Pat. No. 8,255,875.

(51) Int. Cl.
*G06F 9/44* (2006.01)
*G06F 21/10* (2013.01)

(52) U.S. Cl.
CPC *G06F 21/10* (2013.01); *G06F 8/20* (2013.01); *G06F 8/38* (2013.01); *G06F 8/34* (2013.01)

(58) Field of Classification Search
CPC .............. G06F 8/20; G06F 8/30; G06F 8/10; G06F 21/10; G06F 8/34; G06F 8/38
See application file for complete search history.

(56) References Cited

U.S. PATENT DOCUMENTS

| | | | |
|---|---|---|---|
| 5,980,096 A | 11/1999 | Thalhammer-Reyero | |
| 6,026,235 A | 2/2000 | Shaughnessy | |
| 6,324,683 B1 | 11/2001 | Fuh et al. | |
| 6,836,884 B1 * | 12/2004 | Evans et al. | 717/140 |
| 7,151,966 B1 * | 12/2006 | Baier et al. | 700/19 |
| 7,200,840 B2 | 4/2007 | Gschwind et al. | |
| 7,725,882 B1 | 5/2010 | Spertus et al. | |
| 2002/0032902 A1 | 3/2002 | Takeda | |
| 2003/0009253 A1 | 1/2003 | Mcintyre et al. | |
| 2003/0023336 A1 | 1/2003 | Kreidler et al. | |

(Continued)

FOREIGN PATENT DOCUMENTS

JP     2003022201 A *  1/2003  .............. G06F 11/34

OTHER PUBLICATIONS

Seojin Kim, Automated Continous Integration of Component-Based Software: an Industrial Experience, 2008, pp. 1-4.*

(Continued)

*Primary Examiner* — Thuy Dao
*Assistant Examiner* — Mongbao Nguyen
(74) *Attorney, Agent, or Firm* — Amin, Turocy & Watson, LLP

(57) ABSTRACT

A control system development platform is provided. The platform includes a shell component adapted to support development of a control systems application. An abstract model is associated with the shell component to facilitate development of the control systems applications.

13 Claims, 14 Drawing Sheets

(56) References Cited

U.S. PATENT DOCUMENTS

| | | |
|---|---|---|
| 2003/0109951 A1 | 6/2003 | Hsiung et al. |
| 2004/0010778 A1 | 1/2004 | Kaler et al. |
| 2005/0007249 A1* | 1/2005 | Eryurek et al. ............... 340/511 |
| 2005/0044534 A1 | 2/2005 | Darweesh et al. |
| 2006/0218263 A1* | 9/2006 | Martin et al. ............... 709/223 |
| 2007/0067458 A1* | 3/2007 | Chand ............... 709/226 |
| 2007/0226318 A1* | 9/2007 | Rydberg et al. ............... 709/218 |
| 2008/0092067 A1* | 4/2008 | Anderson et al. ............... 715/762 |
| 2008/0092116 A1* | 4/2008 | Kulkarni et al. ............... 717/110 |
| 2008/0092119 A1 | 4/2008 | Sweis |
| 2008/0301649 A1* | 12/2008 | Stall ............... 717/134 |
| 2009/0138844 A1* | 5/2009 | Halberstadt et al. ............... 717/104 |
| 2009/0158237 A1* | 6/2009 | Zhang et al. ............... 717/100 |
| 2009/0158240 A1* | 6/2009 | Zhang et al. ............... 717/104 |
| 2009/0158261 A1 | 6/2009 | Gielniak et al. |
| 2009/0164981 A1* | 6/2009 | Heidasch et al. ............... 717/129 |

OTHER PUBLICATIONS

Rockwell Automation, EtherNet/IP: Industrial Protocol White Paper, 2001, pp. 1-11.*

Calta Computer System Ltd., Modbus/DF1 (PLC5/SLC) translator operator's manual, 2003, pp. 1-13.*

Office Action dated Oct. 27, 2011 for U.S. Appl. No. 12/242,346, 24 pages.

Notice of Allowance dated Apr. 27, 2012 for U.S. Appl. No. 12/242,346, 42 pages.

A. Speck, Component-based Control System, 2000, Edinburgh, Scotland, IEEE Computer Society Press, pp. 2-8.

Barrey W. Hill, An Application Framework and intelligent graphic user interface for multiple accelerator codes, 1999, G. H. Gillespie Associates, Inc., pp. 1-4.

Martin Wollschlaeger, Aspects of the Integration of P-NET into Intranet Technologies, 1997, Otto-von-Guericke University, Magdeburg, Germany, pp. 1-9.

* cited by examiner

| Spy List1 | | | | |
|---|---|---|---|---|
| Name | Logical Value | Physical Value | Type | Comment |
| Var1 | | | BOOL | ("Emergency Shut") |
| Shutdown | | | BOOL | (" First Valve ") |
| Valve1 | | | BOOL | |
| Pressure | | | REAL | (" Current Pressure ") |

← 1200

APPLICATION BUILDER FOR INDUSTRIAL AUTOMATION

CROSS-REFERENCE TO RELATED APPLICATIONS

This application is a continuation application of U.S. patent application Ser. No. 12/242,346, filed Sep. 30, 2008, entitled "APPLICATION BUILDER FOR INDUSTRIAL AUTOMATION," the entirety of which is incorporated herein by reference.

TECHNICAL FIELD

The claimed subject matter relates generally to industrial control systems and more particularly to a development tool that employs language independent models to facilitate automation software design.

BACKGROUND

Industrial controllers are special-purpose computers utilized for controlling industrial processes, manufacturing equipment, and other factory automation, such as data collection or networked systems. Controllers often work in concert with other computer systems to form an environment whereby a majority of modern and automated manufacturing operations occur. These operations involve front-end processing of materials such as steel production to more intricate manufacturing processes such as automobile production that involves assembly of previously processed materials. Often such as in the case of automobiles, complex assemblies can be manufactured with high technology robotics assisting the industrial control process.

In many automated processes, including the basic production of commodities such as food, beverages, and pharmaceuticals, complex state logic is often designed and programmed by Systems Engineers or provided in some cases by automated equipment manufacturers. This logic is often programmed with common PLC ladder logic or higher level languages supported by Sequential Function Charts (SFC). Sequence logic can be employed for a plurality of tasks such as material movement and conveying operations, packaging operations, or as part of an assembly process itself, wherein various stages of an assembly are sequenced from stage to stage until a final assembly occurs. As can be appreciated, much planning and design is required to implement an automated production process that can involve hundreds of machines, computers, and program logic to facilitate proper operation of the respective sequences.

Various software platforms are available from many different controls manufacturers that implement languages such as ladder logic and SFC. Many control software development platforms exist as stand-alone entities however that require many man-years of development and testing before such platforms can be utilized by the development community. Due to the nature of such platforms, they are often designed in an inflexible manner where newer versions of software paradigms and models are unsupported unless a new platform is designed to support such versions.

SUMMARY OF THE INVENTION

The following summary presents a simplified overview to provide a basic understanding of certain aspects described herein. This summary is not an extensive overview nor is it intended to identify critical elements or delineate the scope of the aspects described herein. The sole purpose of this summary is to present some features in a simplified form as a prelude to a more detailed description presented later.

A flexible and extensible architecture exposes the underlying control models and features of an Automation Collaborative Framework yet provides a familiar software design environment to create new features and functions. A design shell is adapted to support rapid software development for a control and industrial automation platform. Such shell can be adapted from available Windows technologies but substantially any type of shell could be similarly constructed such as from UNIX, Java, Linux, and so forth. The shell provides an interface development platform that is tailored to the needs of control systems designers.

The development platform employs abstract programming models that enable developers to design control solutions in an abstract setting while facilitating code deployment and execution on substantially any type of end hardware platform. In one aspect, an Abstract Automation Model (AAM) is derived from common base model solutions or standards such as IEC 61131 and 61499, for example. Although any programming standard can be utilized for the underlying model, 61131 and 61499 support a majority of known automation languages in the world today. The AAM defines control structures that represent abstract data objects having properties of a configuration, resource, program, and so forth. As part of a larger framework or development environment, a Concrete Automation Model (CAM) provides data interfaces associated with the generic data objects and according to a designated project format of differing development environments. For instance, various versions of a development program may have associated CAMs that link or map the respective versions to the underlying abstraction of the AAM.

To the accomplishment of the foregoing and related ends, the following description and annexed drawings set forth in detail certain illustrative aspects. These aspects are indicative of but a few of the various ways in which the principles described herein may be employed. Other advantages and novel features may become apparent from the following detailed description when considered in conjunction with the drawings.

BRIEF DESCRIPTION OF THE DRAWINGS

FIG. 11 illustrates an example dictionary view for an automation development platform.

FIG. 12 illustrates a spy list for an automation development platform.

DETAILED DESCRIPTION OF THE INVENTION

A software development platform is provided that employs abstract models to support substantially any type of control language yet not constrain designers to any particular language format or interface. In one aspect, a control system development platform is provided. The platform includes a shell component adapted to support development of a control systems application. An abstract model is associated with the shell component to facilitate development of the control systems application.

It is noted that as used in this application, terms such as "component," "module," "shell," "model," and the like are intended to refer to a computer-related entity, either hardware, a combination of hardware and software, software, or software in execution as applied to an automation system for industrial control. For example, a component may be, but is not limited to being, a process running on a processor, a processor, an object, an executable, a thread of execution, a program and a computer. By way of illustration, both an application running on a server and the server can be components. One or more components may reside within a process or thread of execution and a component may be localized on one computer or distributed between two or more computers, industrial controllers, or modules communicating therewith.

Figure 1:
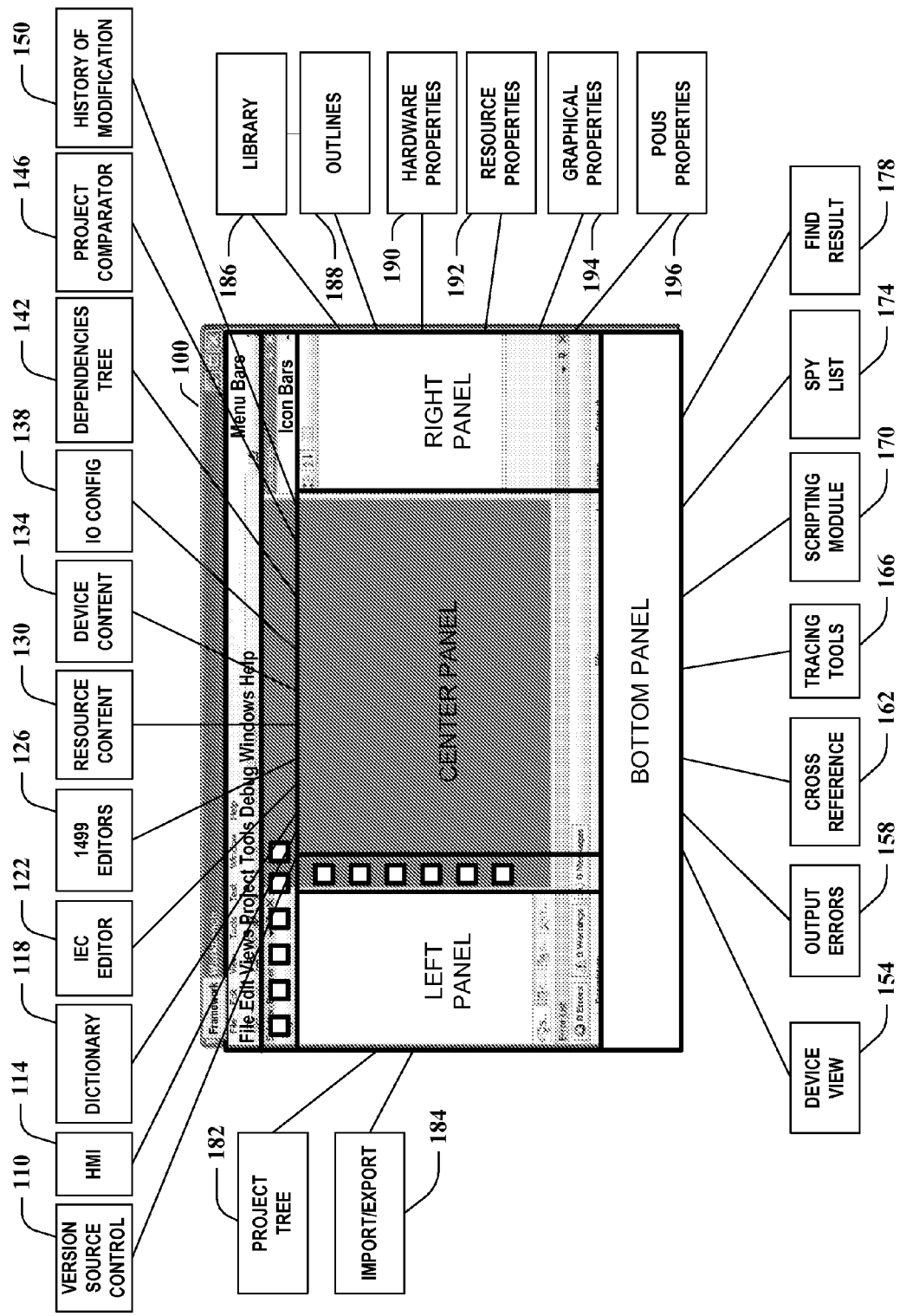
FIG. 1 is a schematic block diagram illustrating a shell interface that employs abstract automation models to facilitate software development in a controls environment.

Referring initially to FIG. 1, a shell interface 100 is provided that employs abstract automation models to facilitate software development in a controls environment. As shown, the shell 100 is adapted for various features that facilitate rapid development, debug, and deployment of control systems solutions. Such features include version control components 110 to allow revision control of software. Human machine interface (HMI) support is provided at 114 along with a language dictionary 118. Various editors 122-130 are provided and are described in more detail below. Device content components 134 are included along with I/O configuration capabilities 138. Dependency tree support is provided at 142 in addition to project comparators 146, and modification history components 150. Software debug tools include device views 154, error outputs 158, cross references 162, tracing tools 166, along with script modules 170, spy lists 174, and result search tools 178. Project controls are provided at 182 and 184 including import and export capabilities at 184. Library and property configurations are provided at 186-196. All the features 110-196 that have been briefly mentioned here will be described in more detail below.

In general, the interface 100 provides a flexible and extensible architecture that exposes the underlying control models and features of an Automation Collaborative Framework yet provides a familiar software design environment to create new features and functions. A design shell 100 is adapted to support rapid software development for a control and industrial automation platform. Such shell 100 can be adapted from available Windows technologies but substantially any type of shell could be similarly constructed such as from UNIX, Java, Linux, and so forth. The shell 100 provides an interface development platform that is tailored to the needs of control systems designers.

The development platform and shell 100 employs abtract programming models that enable developers to design control solutions in an abstract setting while facilitating code deployment and execution on substantially any type of end hardware platform. In one aspect, an Abstract Automation Model (AAM) is derived from common base model solutions or standards such as IEC 61131 and 61499, for example. Although any programming standard can be utilized for the underlying model, 61131 and 61499 support a majority of known automation languages in the world today. The AAM defines control structures that represent abstract data objects having properties of a configuration, resource, program, and so forth. As part of a larger framework or development environment, a Concrete Automation Model (CAM) provides data interfaces associated with the generic data objects and according to a designated project format of differing development environments. For instance, various versions of a development program may have associated CAMs that link or map the respective versions to the underlying abstraction of the AAM.

It is noted that components associated with the interface 100 can include support for various computer or network components such as servers, clients, controllers, industrial controllers, programmable logic controllers (PLCs), batch controllers or servers, distributed control systems (DCS), communications modules, mobile computers, wireless components, control components and so forth that are capable of interacting across a network. Similarly, the term controller or PLC as used herein can include functionality that can be shared across multiple components, systems, or networks. For example, one or more controllers can communicate and cooperate with various network devices across the network. This can include substantially any type of control, communications module, computer, I/O device, sensors, Human Machine Interface (HMI) that communicate via the network that includes control, automation, or public networks. The controller can also communicate to and control various other devices such as Input/Output modules including Analog, Digital, Programmed/Intelligent I/O modules, other programmable controllers, communications modules, sensors, output devices, and the like.

The network can include public networks such as the Internet, Intranets, and automation networks such as Control and Information Protocol (CIP) networks including DeviceNet and ControlNet. Other networks include Ethernet, DH/DH+, Remote I/O, Fieldbus, Modbus, Profibus, wireless networks, serial protocols, and so forth. In addition, the network devices can include various possibilities (hardware or software components). These include components such as switches with virtual local area network (VLAN) capability, LANs, WANs, proxies, gateways, routers, firewalls, virtual private network (VPN) devices, servers, clients, computers, configuration tools, monitoring tools, or other devices.

Figure 2:
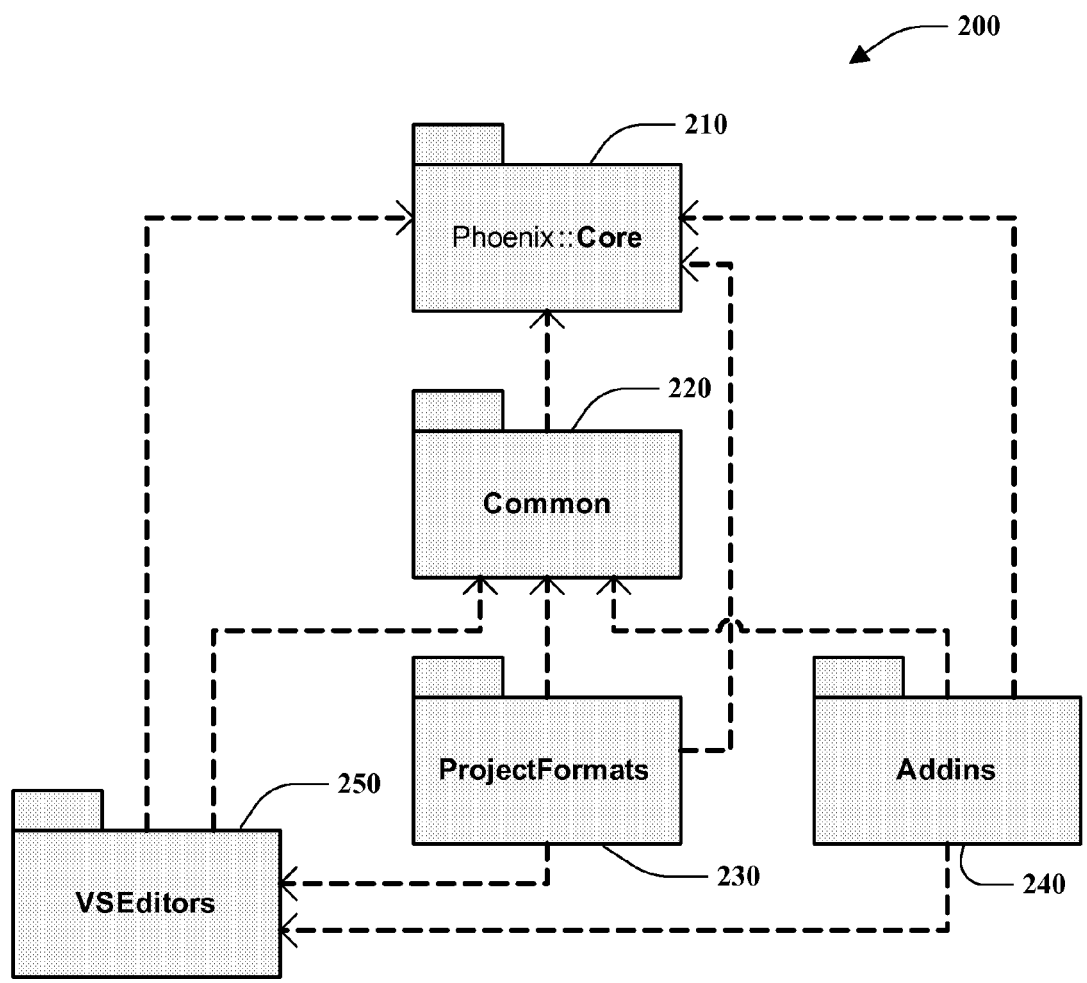
FIG. 2 illustrates an example platform architecture.

Turning now to FIG. 2, an example platform architecture 200 is illustrated. The architecture 200 is also referred to as Application Builder that includes a Core 210 and Common namespaces 220. The Core 210 groups system-related reusable components such as a logger, rights manager and shell described below. The Common namespace 220 combines reusable Application Builder data, Services and views. The lower portion of FIG. 2 also identifies that multiple project formats 230 and add-ins 240 are supported. The Application Builder 200 also provides generalizations editors 250 (e.g., Visual Studio adapted for controls) to perform an easier interconnection of project format files and the common views.

The core rights namespace (described below) defines the major proactive security mechanism. Security mitigates possibilities of project data hijacking and corruption. In one aspect, component protection is provided. This includes ensuring business components are protected with security roles. For instance, a method call fails when the role (e.g., manager, technician, engineer) has not been granted permission. Each role is associated with a licensed feature. This feature naming policy should allow a fine-grain role assignment to each component method.

At run-time the protected method should query for its role permission, either using .Net role-based declaration attributes or using an algorithm preamble. The algorithm preamble presents the advantage to disable the security validation for intensive processing, such as parsing a source code file or generating target execution image. Failure to this test is logged and results in a security exception.

In another security aspect, role mappings are provided. This includes adopting dynamic role mappings based on business rules, process context or user role. Role mappings are under control of the feature matrix described in more detail below. The feature matrix maps roles on permission sets. The set delegates each one of its sub-permissions and retains the most restrictive access. Rich-client authentication can also be provided that includes adopting a .Net main thread principal instead of sending username/password credentials through objects. The thread principal connects role validation on the feature matrix. Contextual permission objects mapped by the features matrix are hosted by each instance of concrete model.

Secure auditing can also be provided. This includes deploying a secure logging and auditing mechanism (audit interceptor) to record and provide a means of identifying and auditing failed direct access attempt, policy violations, undefined user role memberships, and exceptions. In one aspect, secure auditing is optional. The usual logging may be configured to redirect log entries on a console to cause special alarms. Data validation includes adopting well-defined validation procedures in the business component for handling data-format and business data. This ensures data integrity and protects against malicious data injection. Data validation is performed on input parameters and assigned property values. An algorithm preamble block performs assertion tests. Failure of the respective tests is logged and results to an invalid argument exception.

In yet another security aspect, deployment components can be restricted. For example, do not store unused components in a production environment. For instance, each facultative component can be stored in a specific assembly DLL. The production team could also avoid building an edition with unused components. Security also includes protecting an editor's intellectual property. For example, do not provide DLL or EXE that may be easily replaced or disassembled. Typically, all stored DLL or EXE are signed to avoid easy replacement that hackers may perform to hijack from normal behaviors. Disassembling could be harder with code obfuscation. Signing is systematically applied even in development process. Obfuscation could be applied to released versions only.

Figure 3:
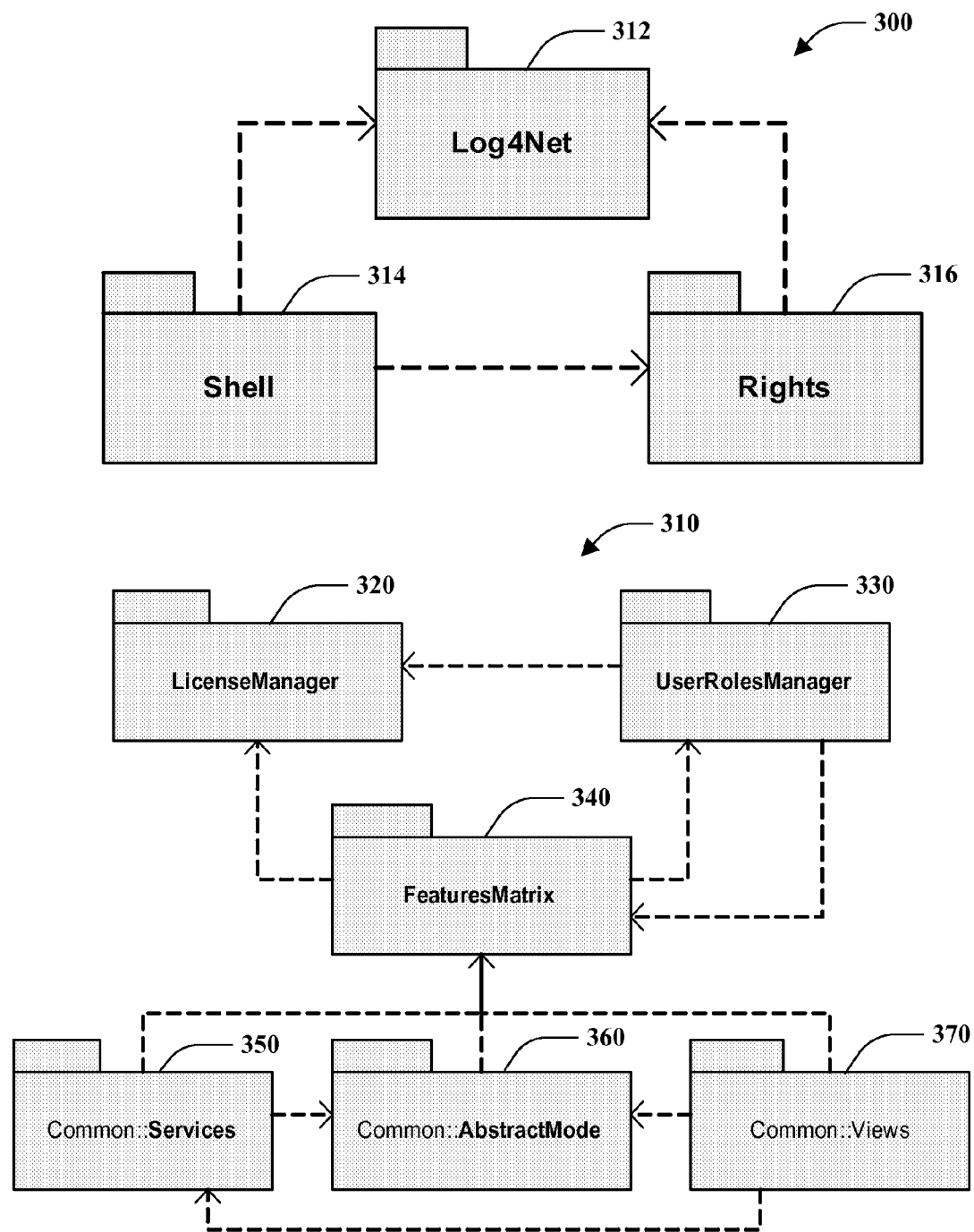
FIG. 3 is a diagram illustrating example system core and rights components.

Referring now to FIG. 3, example system core components 300 and system rights components 310 are illustrated. At 312, Log4net is a port of an Apache log4j framework to a .Net runtime. The core components 300 also include a shell and rights component 316. The logging framework 312 follows that the speed of logging (or rather not logging) is an important consideration. It is designed so that log statements can remain in shipped code without incurring a high performance cost. Log filters may be configured to avoid logging events according to criteria such as Mapped Diagnostic Contexts (MDC), Nested Diagnostic Contexts (NDC), error level match, and so forth. New filter types could be created to allow more arbitrary filtering.

The framework 312 writes log events to multiple outputs, such as a database, a remote sink using .Net remoting for example, a web service, a plane text file with or without multiplexing, and so forth. New target types could be created to redirect events in some other outputs.

The framework 312 supports hierarchical logging. This is a suitable fit with component based development, where each component has its own logger. When individually tested, the properties of these loggers may be set as the developer requires. When combined with other components, the loggers inherit the properties determined by the integrator of the components. One can selectively elevate logging priorities on one component without affecting the other components. This can be achieved through configuration files. The framework 312 can be configured using an XML configuration file. Configuration information can be embedded within other XML configuration files as described by .Net configuration specifications. The framework 312 can also be configured programmatically.

The Rights namespace 316 is based on a license manager 320, a user-roles manager 330 and a feature matrix 340. The feature matrix 340 combines constraints on features and provides resulting permissions to other products or modules.

The license manager 320 includes a license object that conforms to .Net Component Model's licensing specification. It is a serialized collection of command features' permissions and constraints. A command feature is the simplest unit of action allowed on a data object. The system may count thousands of features that are grouped under features. The hierarchy shown provides an example of feature bundles and features relationships for basic edition operations such as the following example:

---

Edit_Resource
Edit_POU
...

---

A feature may be optionally related to constraints such as a counter range. A constraint specifies the condition to set the feature's availability status among the following possibilities: Full, Read-Only; or Deny. Constraints are serialized in the license object next to the related feature.

The License also defines events and delegate types. Other components may be notified when some licensing change arise, such as unplugged USB device or network cord, for example. A License Provider conforms to Component Model's rights specification. It provides a license serialization service. The license object itself may be serialized in a file stored either in the host file system or in a signed USB key. It may also be provided by a license server. In such case, the License Provider is connected on a license server from which the license is retrieved. The license provider has methods activate license keys from a corporate web site. In such case, the provider sends the license key and retrieves the license object. The retrieved license is serialized on the provider's storage location. The provider retrieves licenses storage location data using a setup mechanism in conformity with .Net configuration specifications. A License Editor is a .Net User Control. It provides a user interface to display the available features' permissions and constraints. The editor also provides license key activation UI and license object edition. As shown, the rights components 310 include a services component 350, an abstract mode component 360, and a common views component 370.

Figure 4:
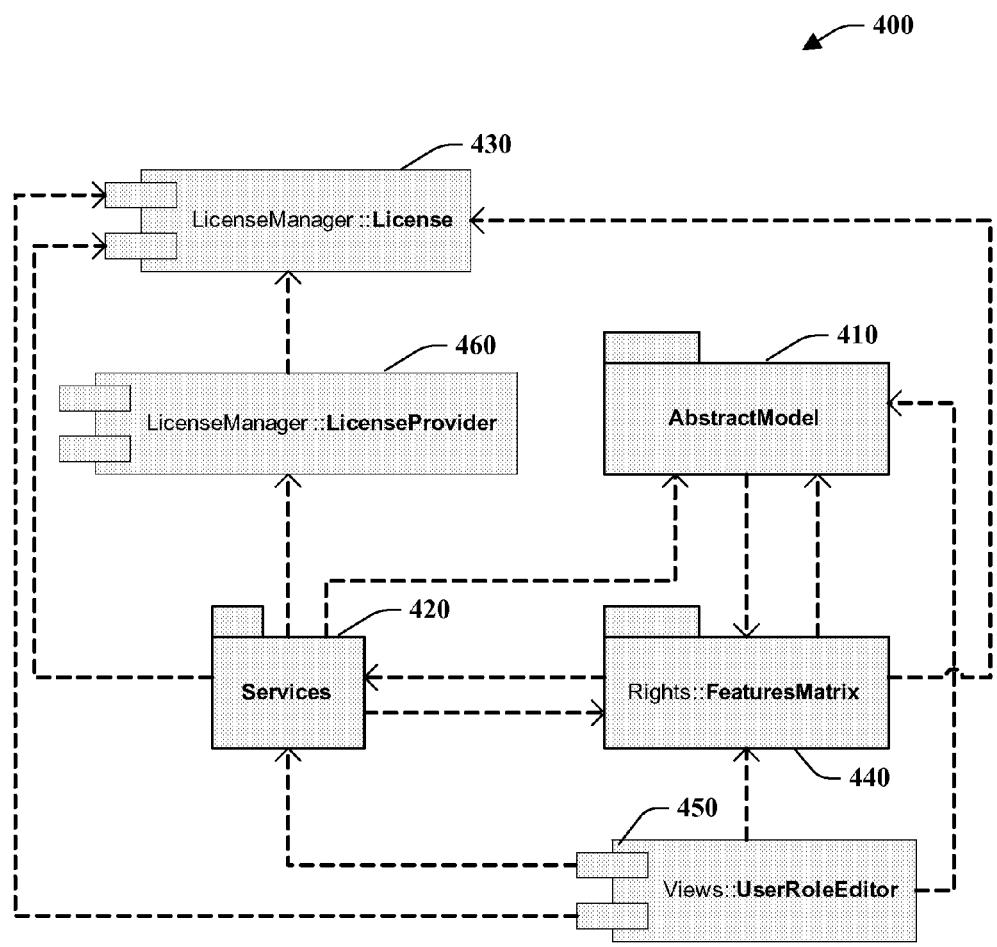
FIG. 4 is a diagram illustrating components of a user role manager.

FIG. 4 illustrates example components that support a user role manager 400. 400 for an industrial control system. The User Role Manager 400 employs an abstract data model 410 for user roles and authentication, and mappings of roles with features, where user role storage is related to project formats. The abstract model's 410 interfaces are defining properties and methods commonly attributed to user role management. Some interfaces may define events and delegate types to provide change notifications. Services 420 are User Role management services. These are defining User Role data processing based on the abstract model 410. Most Services 420 are associating groups with an authentication mechanism. Services also work to associate roles with features provided by a license manager and custom features from a feature matrix. A user role editor can be a .Net User Control. It provides user interface to display the available user groups, to set groups authentication and associate features retrieved from a License Provider 460 and Feature Matrix 440.

The features matrix 440 is a decision table that dynamically update feature's permission from different sources. This matrix is used in at least 3 areas of the application:
1. At menu and toolbar command updates;
2. At public methods invocation and properties "setters";
3. Within forms validation methods;

The feature matrix 440 maps all features on root access permission objects. The structure of the feature extends the permission object defined in .Net Security Specifications. The extension adds a combination of the three following command status flags:
1. Full (Read & write access to a feature)
2. Read-Only (Read access to a feature)
3. Deny (No access to a feature.)

The feature matrix creates a permission set for each feature declared by loaded modules. At the initial feature declaration, it retrieves the feature status from the License Provider 460. The set aggregates license, user-role or element status permission objects. Any module, project format, or add-in can register additional permission objects to this set. Any unknown feature name is considered as custom and the matrix 440 assumes they are enabled. In this case, the licensing validation is under the control of this extension. A permission set is used by a standard command update handler and licensed methods. A licensed method invokes the permission's "Demand" method, which raises a Security Exception when the command status isn't "Enabled." Command update handlers assign the permission set's command status.

Figure 5:
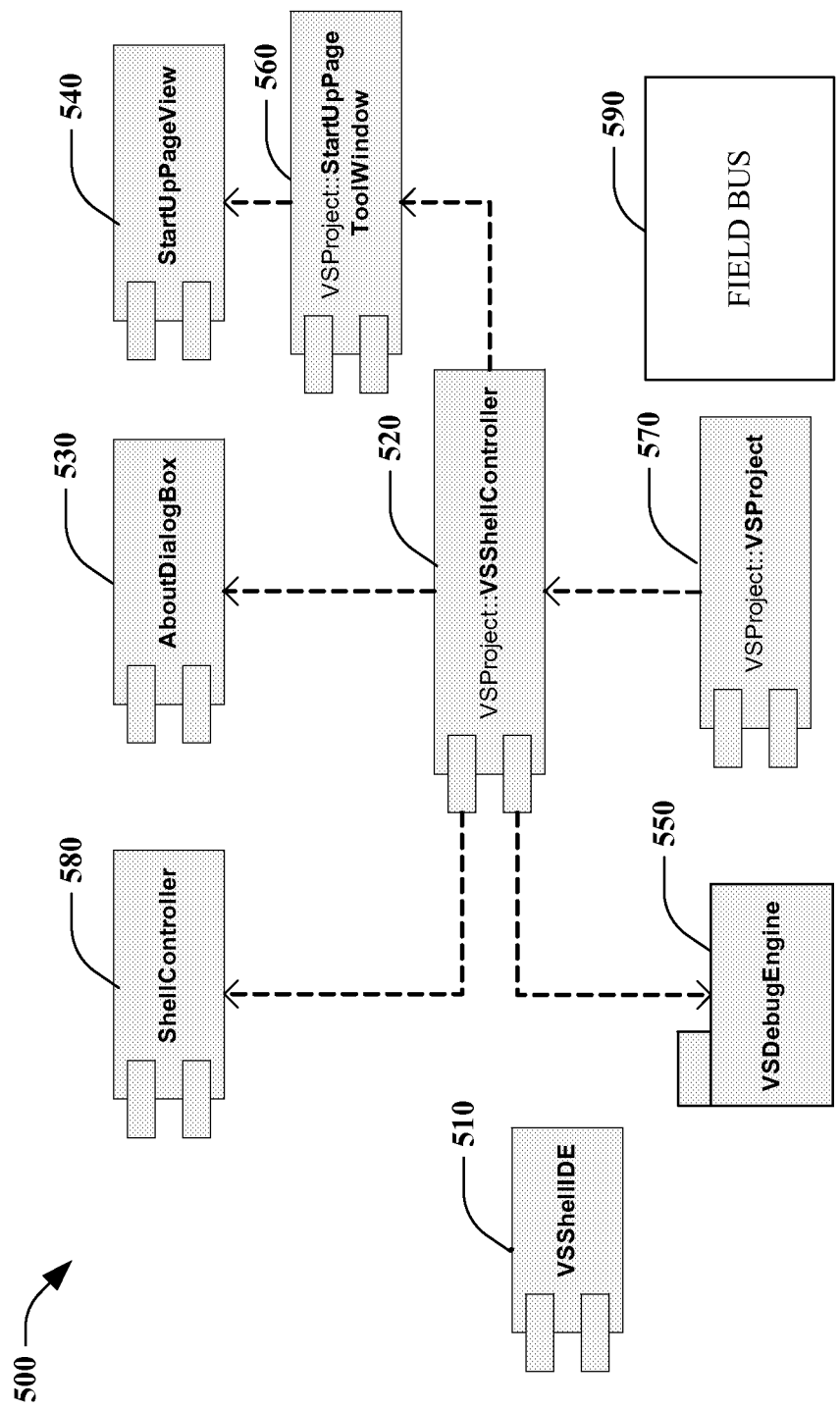
FIG. 5 illustrates components of a shell for an industrial automation development tool.

FIG. 5 illustrates components of a shell 500 for an industrial automation development tool. The Shell 500 is a host for user interface services and an integrated development environment (IDE) 510. A Service provides methods to list the installed modules, to display an About Box 530 or the Start-up Page 540. It is also provides access to the Rights management services. The About components 530 provides methods to activate a dialog box that display the product name and version. The About dialog 530 provides detailed products and modules that it retrieves modules from the Shell Service 520.

A debugger engine 550 delegates debugging commands to Field Bus Protocol instances which are described below that are delegating-back event notifications to the debugger engine 550. The debug engine 550 also manages multiple resource connections. The engine 550 provides component interfaces to cause the Locals, the Watch and the Call Stack tool windows to operate. Locals and Watch tool windows are indirectly subscribing to Field Bus Protocol's variables groups and reflect user changes on the protocol's subscription interfaces. The Call Stack tool window is also indirectly querying stack frames from the protocol's connections. Breakpoints and stepping commands and events are also translated by the engine 550.

The startup navigation window 540 fills the client design area with a "web-page" style pane that enumerates shortcuts on the last opened solutions, projects, documents, other shortcuts to create new designs and other designating "how-to" help topics. It is a suitable instrument to introduce new users, enables the Application Builder to be easier to use, and provides a marketing platform to announce related products and services.

A Start-up Editor Pane 560 is a document that opens on start-up. The user may disable it using option pages. The editor loads a page view indicated by configuration files.

At 570, project types are considered. Packages a provide deep integration directly in the IDE 510 by enabling access to the same tools and components used by the IDE frameworks. The part of the Managed Package Framework (MPF) that deals with creating new project types isn't provided as part of the assemblies. Source code called "ProjectBase" is provided that the Project Type Package assembly includes. The Project Type Package 570 makes the association between a project file extension and a managed class GUID. The IDE shall instantiate this class when a project file opens. This package class is also a suitable place to register common tool windows and commands. At a minimum, the package should register and process About Box query commands.

Implementing a project type implies to manage the project file system hierarchy tree according to desired behavior. A Shell Service specialization defined with the Project Type 570 provides the Service's methods for an integration package. The project package instantiates this specialization to retrieve module information from unloaded packages and add-ins. A distinct project type represents each supported programming language. In addition to project types, the IDE defines solutions, which are an aggregation of many projects. The inter-language power of .Net is provided by the solution and not by the project.

It is noted that the IDE is usable in the following two modes:

Integrated mode—The integrated application shares a common platform with other languages and tools; and Isolated mode—The integrated application is made available in a branded IDE container that is one of the services of without the common languages and tools.

As shown, a shell controller 580 and a field bus component 590 can also be provided. The Field Bus component 590 provides a common API to manage dialog, download, upload and on-line change with targets. The API should be extensible to support any Automation protocol. A Field Bus namespace defines abstract interfaces to communicate with the target. This implies a façade interface and a set of sub-Service interfaces to manage dialog. The abstract service unifies communication error messages in the .Net exception pattern. The protocol's message codes are converted to the Field Bus's counterparts, packaged and raised back to the caller (not the target channel) in a Protocol Violation Exception.

The abstract service structure has some similarities with an OPC DA and EA server. More specifically, it provides methods to subscribe on a group of variables and to set or lock/unlock variable values. Any variable value set or locked/unlocked are delegated to the protocol's specific language and channel. A value change notification that arises from the protocol channel is packaged in an event argument and notified back to the group's subscribers thru an event. The abstract service structure has also some similarities with a debug engine. More specifically it provides methods to perform step-by-step debugging, to manage break-point notifications and stack frames. A break-point notification that arises from the protocol's channel is packaged in an event argument and notified back to the engine's subscriber thru an event. Stack frame construction takes part of the event packaging. An empty stack frame object may be set if a target does not support this feature. The Field Bus abstract service finally provides methods to support downloading, uploading and on-line change. These operations are asynchronous and provide progress status to a client application.

Figure 6:
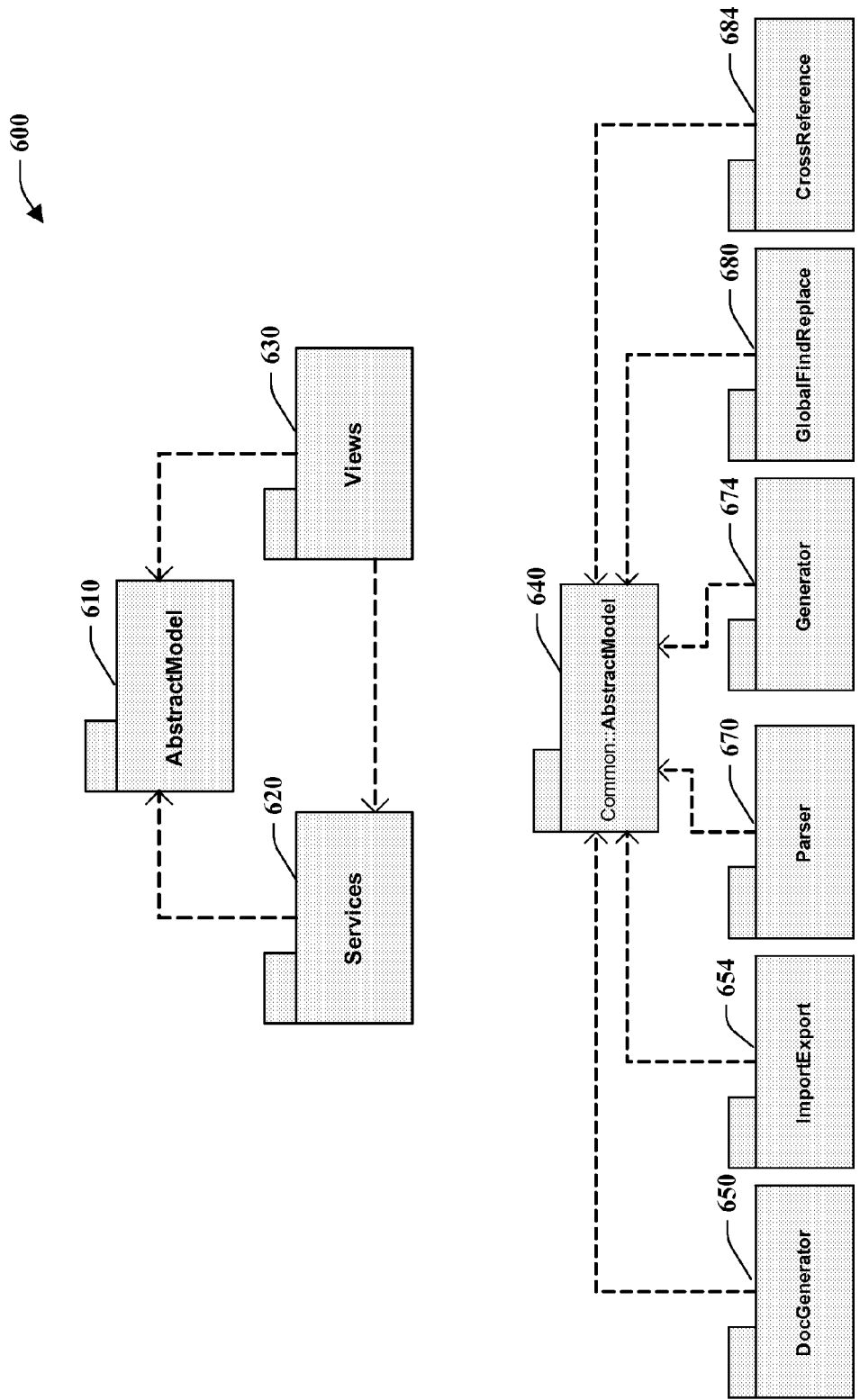
FIG. 6 illustrates example components of an application builder interface for an automation development platform.

FIG. 6 illustrates example components of an application builder interface 600. The Application Builder 600 supports existing functionalities of with a plurality of universal user interfaces. The data and functionalities are proposed in an almost identical format regardless of project format. The user interacts with and obtains the same menus, views and printed reports for any project format. The Application Builder architecture 600 allows the integration of a large number of project formats. Partners can also add value or reduce the functionalities according to definite needs. An IDE container could be replaced or withdrawn to integrate the Application Builder in another system.

The Application Builder 600 provides a common data model, UI components, and collection of processing services to manage automation projects. This namespace defines reusable classes without any relation to a particular IDE framework. FIG. 6 provides the architecture of the Application Builder Common namespace:

In this figure represents the Application Builder provides a 3-tier architecture:

1. An abstract model 610 captures an automation domain's commonly used data structures. It groups programming interfaces, where each one reflects a possible aspect that could be exposed in data of an automation project.

2. Services 620 are processing units that use or change data exposed by the abstract model 610.

3. Views 630 are user interface controls for presenting data to a user. They use or change data exposed by the abstract model 610 using data abstract interfaces or indirectly through the services 620.

The model 610 is a set of abstract interfaces. Each interface defines an aspect of project element with the related basic edition methods. This abstraction layer should be superposed on a concrete project format data model and reflect the changes on specific project structure. The concrete models' project elements implements a .Net interface IServiceProvider. This provides contextual service providers that are conforming to .NET services specifications. The abstract model's interfaces are defining properties and methods commonly attributed to IEC 61131 or IEC 61499 elements. Some interfaces may define events and delegate types to provide change notifications.

Services 620 are data processing components. It is to be appreciated that not all the possible Services that the Application Builder could ultimately provide are illustrated. It is however possible to enumerate some example services. Each service has an abstract interface 640. A concrete model implements and publishes its services to make them working within the appropriate context.

Figure 7:
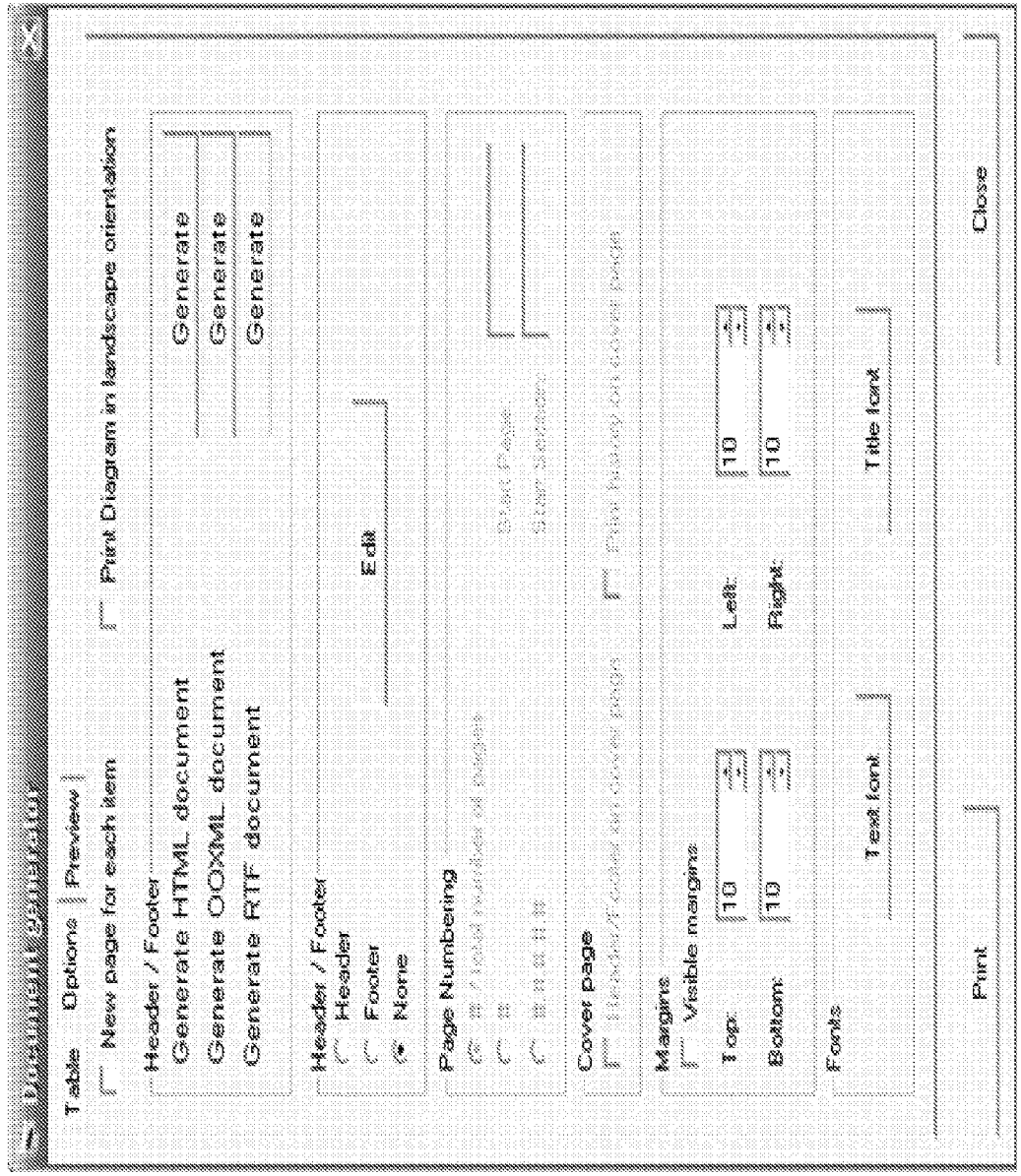
FIG. 7 illustrates an example dialog interface for a document generator for an automation development platform.

A Document Generator 650 produces a formatted document according to user's preferences and choice of chapters. The document formatting is based on a template. The document may be generated in the common formats; such as PDF for example or directly sent to a printer. The generator uses the views printing methods for diagrams and charts. The generated pictures are sliced to fit in the generated document's page layout. This service has a dialog box to specify the document generation parameters. An example dialog 700 is illustrated in FIG. 7.

Referring back to FIG. 6, an Import/Export component 654 is an abstract controller façade to standardize calls and make it available to service providers as defined by .Net services specifications. Importing includes parsing archive files to populate a Model using abstract interfaces. Exporting includes generating archive files from a Model using abstract interfaces. An import controller works in collaboration with a Parser. It makes preliminary operations such as decompressing, and launches a parser 670 to populate a model. An export controller works in collaboration with a Generator 674. It launches a generator and performs post operations such as compressing.

The Parser controller 670 performs the analysis of the source files and reflects results in the concrete project format model. The project format defines a complementary abstract model to complete the general abstract model. The parser 670 uses those abstract interfaces to indirectly fill the concrete project format model.

The Generator controller 674 writes formatted files according to a project format. This generator traverses data made available by the Abstract Model and the project format's complementary Abstract Model. This service could be used to provide interoperability among project formats. The generator should generate files without its project format complementary Abstract Model. In such case the generator 674 uses default values to maintain compatibility with the generated file's target.

A Global Find/Replace controller 680 defines an abstract façade interface. The default controller performs a tree traversal in the Abstract Model. It delegates each visited contextual Find/Replace controller. A general element Find/Replace controller is provided. A project format may also extend or even replace it. Each contextual service provider stores an instance of this controller. A Cross Reference controller 684 performs a tree traversal within the Abstract Model 640. It retains derived types usage, function block instances, as well as function block calls and function calls from Abstract Syntax Tree (AST).

Except for the Diagram namespace, views 630 are .Net user controls but other types of controls can be provided. They could delegate services or use abstract object interfaces to modify or query data. Deployment makes a document that specifies a connection between project elements. It can take the appearance of a network diagram with the various project elements and communication devices.

Figure 8:
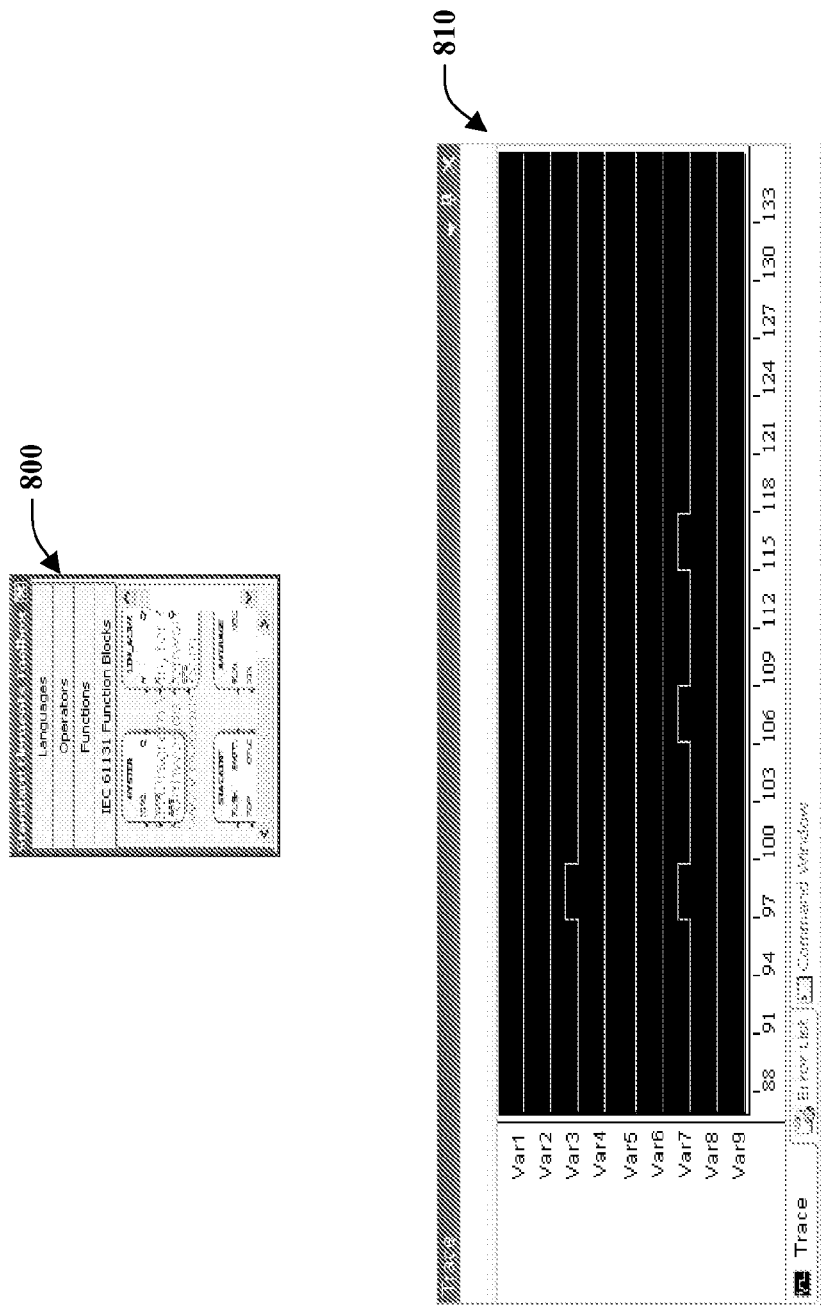
FIG. 8 illustrates an example language stencil and trace display for an automation development platform.

FIG. 8 illustrates an example language stencil and trace display. A Language Stencil window 800 is a navigation bar filled by Language Stencils elements. An Automation Engineer uses this service to configure or program control applications using simple drag & drop operation of the provided figures to the opened document's window. A Language Stencil component (not shown) retrieves Language Stencils from a Diagram namespace. It requests Language Stencils from the Diagram namespace and configures the navigation bars.

A trace tool and display 810 is used to display signals in a graphical chart. It receives signal change notifications on time and reflects this change on the chart. It should allow real-time tracing and possibility serialize historical data.

Figure 9:
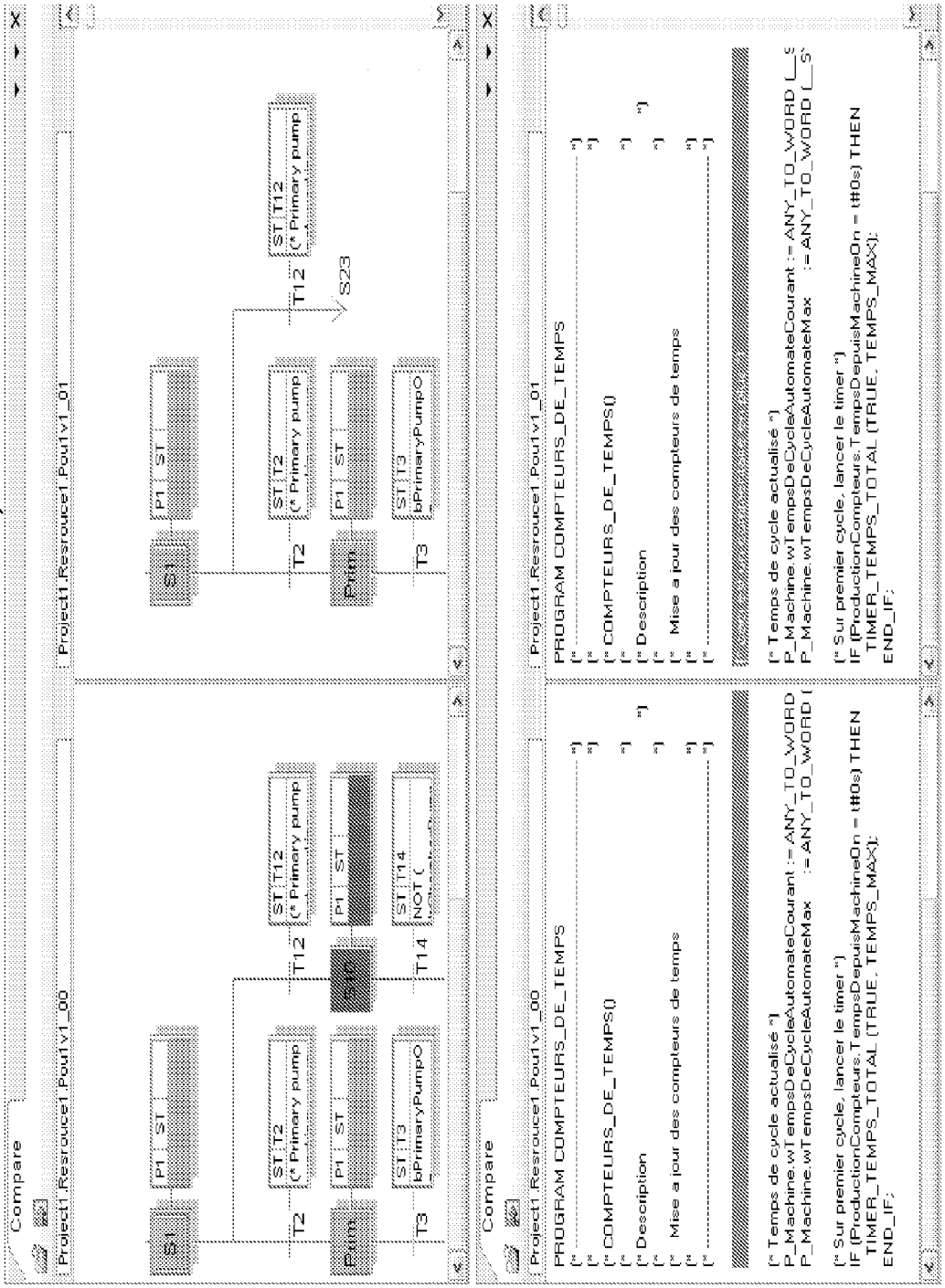
FIG. 9 illustrates an example comparator interface for an automation development platform.

FIG. 9 illustrates an example comparator 900. The comparator 900 enables graphical or textual comparisons of at least 2 project elements of the same type. This component 900 may be launched from the command-line or from the Application Builder. A block selector is a function block and instances filtering view. It is used to insert a function block function block call. A variable selector is a variable filtering view. It is used to insert a variable usage within a code module.

Figure 10:
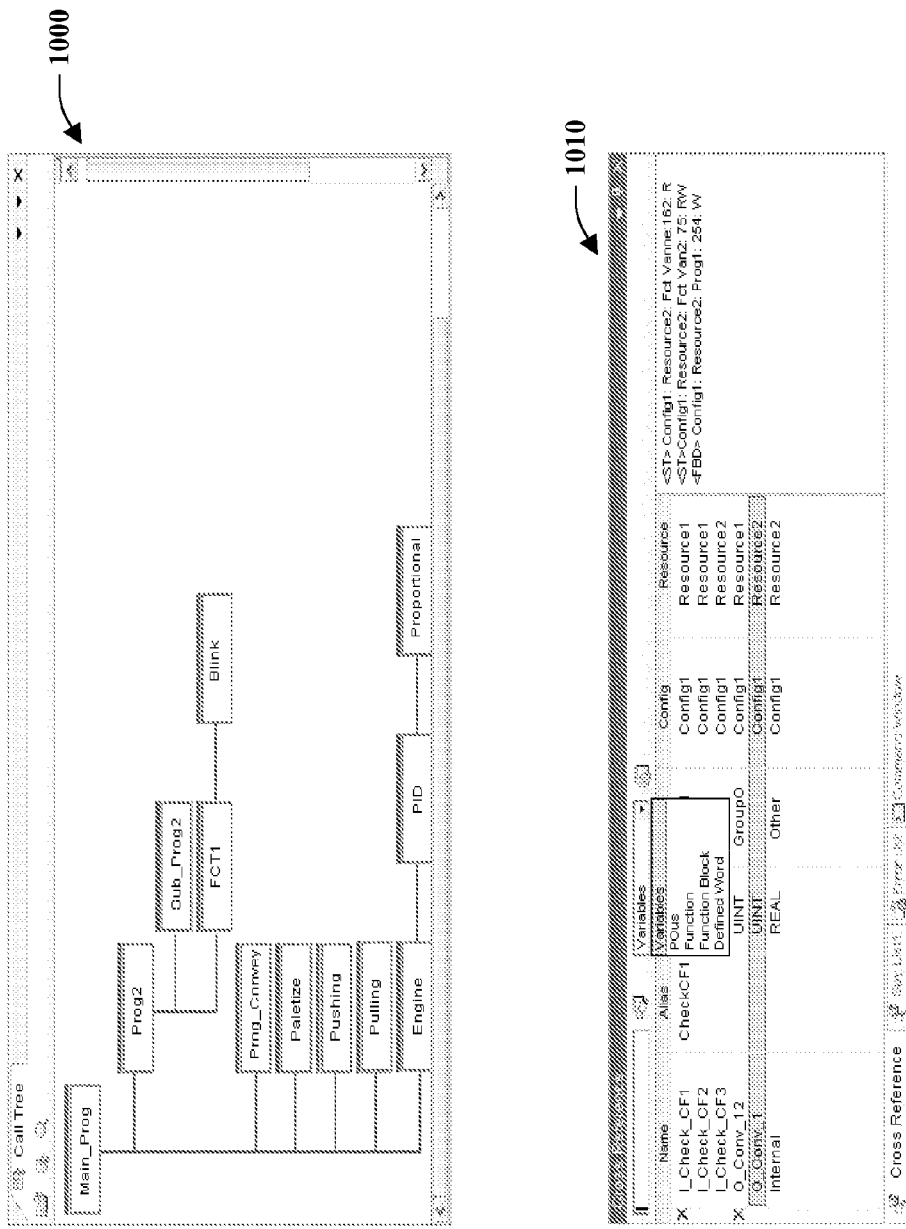
FIG. 10 illustrates an example call tree and cross reference component for an automation development platform.

FIG. 10 illustrates a call tree 1000 and cross reference component 1010 for an automation development platform. The Elements and Call Tree component 1000 builds and browses a dependency tree. It gives the possibility to understand the application sequence by showing calls among POU's. The Cross Reference component 1010 lists variable usages, and POU's of a project to navigate. Selecting an item directs the user to observe where the variable is referenced.

Figure 11:
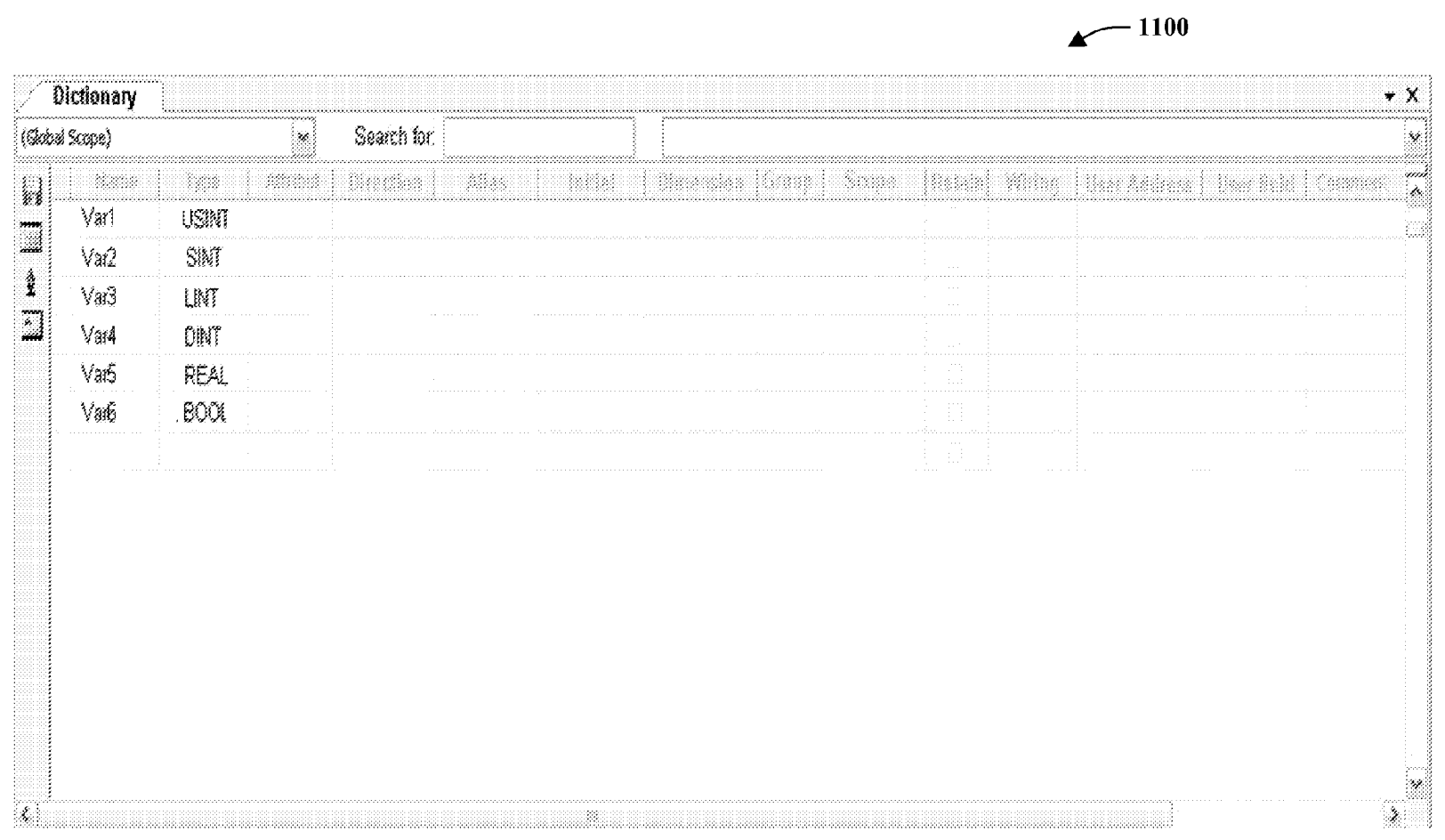

FIG. 11 illustrates an example dictionary view 1100 for an automation development platform. The Dictionary View 1100 is a grid-style browser variables, parameters, derived data types and defined words. This grid enables viewing, sorting, and grouping symbols. The view 1100 also allows managing drag-and-drop operation of variables for an easier variable, contact, or coil creation, for example. By default the view 1100 could be opened in the same area as documents but the user can make it a docked or a floating window. The displayed columns may vary depending on the type of browsed objects. The available columns are enumerated as the following examples:

4. Name—Name of the Variable.
5. Type—Type of the variable
6. Initial value—initial value of variables
7. Group—Group the variable belong to
8. Attribute—Attribute of the variable
9. Direction—Direction of variable (Input, output, input-output, Internal)
10. Dim—Dimension of Arrays variables
11. Max—Maximum string length for variable of type STRING
12. Alias—Alias of variable
13. Scope—Scope of the variable. Defined
14. Wiring—Channel to which the variable is connected
15. Retain—Variable to be save don backup memory
16. User address—Network address used for Modbus
17. Comment—Comment of variable up to 255 characters
18. User—User Field as STRING that could be filled by User
19. Forcing—Locked or unlocked FIG. 12 illustrates a spy list 1200 for an automation development platform. A Spy List is employed to set and display variable or parameter values when the Application Builder is on-line. The spy list 1200 can be created by the user and should be displayed in the last usage disposition. This view differs from Locals and Watch lists for differencing logical and physical values. Moreover the spy list 1200 displays the variables and instances short descriptions. The user can drag-and-drop variables or parameters to spy from the dictionary or an editor. The copy-and-paste is also possible to register spied variable or parameters. The user can also type the variable or parameter name directly on the list to perform the same operation.

Figure 13:
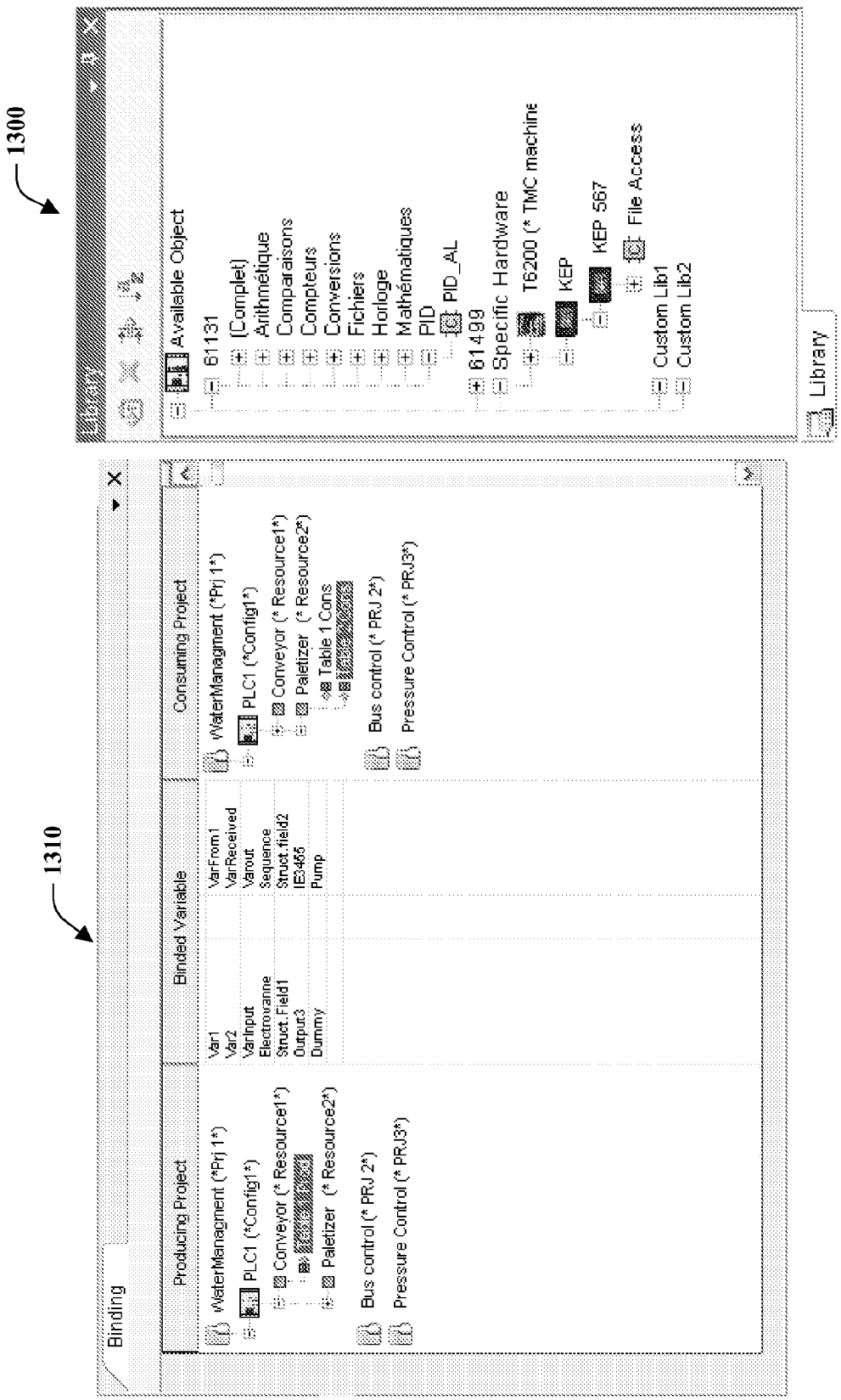
FIG. 13 illustrates a hierarchy view and a binding component for an automation development platform.

FIG. 13 illustrates a hierarchy view 1300 and a binding component 1310 for an automation development platform. A Project Hierarchy reflects the content of a project on a tree view. It provides common edition commands such as Create, Delete or Rename an element, Display Properties and so forth. Hierarchical relationships across elements depend on the host project structure. The hierarchy tree reflects the same structure as provided by the project. A Library Hierarchy reflects all detected libraries on a tree view. Libraries are detected in directories provided by a configuration file. It provides the same edition commands as the Project Hierarchy and supplementary commands to broadcast or search libraries outside of the configured directories. Hierarchical relationships across elements depend on the host project structure. The hierarchy tree reflects the same structure as provided by the project. The application builder manages all libraries in the same tree and places the library name at the tree root.

An I/O Configuration component (not shown) browses the hardware devices in a tree structure and provides direct I/O variables addresses. In cooperation with the Dictionary View described above, an I/O Configuration component allows to mapping direct /IO variables with symbolic variables. The mapping should be visible from both the I/O Configuration and the Dictionary. This component is a client of the Project Model and the Feature Matrix services. In some situations, the user may perform drag-and-drop of variables from the dictionary and in such case the component also becomes the client of the Dictionary component.

At 1310, a binding component is illustrated. This component sets all variables to exchange between resources. The component loads the binding producer and consumer groups or variables. It enumerates them in a view that helps the user to make pairs, connecting producers of a resource to consumers of another resource.

A diagram editor (not shown) can be provided for automation deployment and programming. It provides an edition surface to display shapes from a Language Stencil and applies the shapes' semantic rules and on-line behaviors. The shapes that make a diagram are grouped by language or diagram type. In the editor surface, drawing areas are mixing shapes of the same groups and those areas may be linked to exchange data. A Language Stencil Designer (not shown) allows creating new diagramming shapes to be presented in a General Multi-Layer Editor. Shapes are saved in files called Language Stencils and made available by the Diagram namespace.

Figure 14:
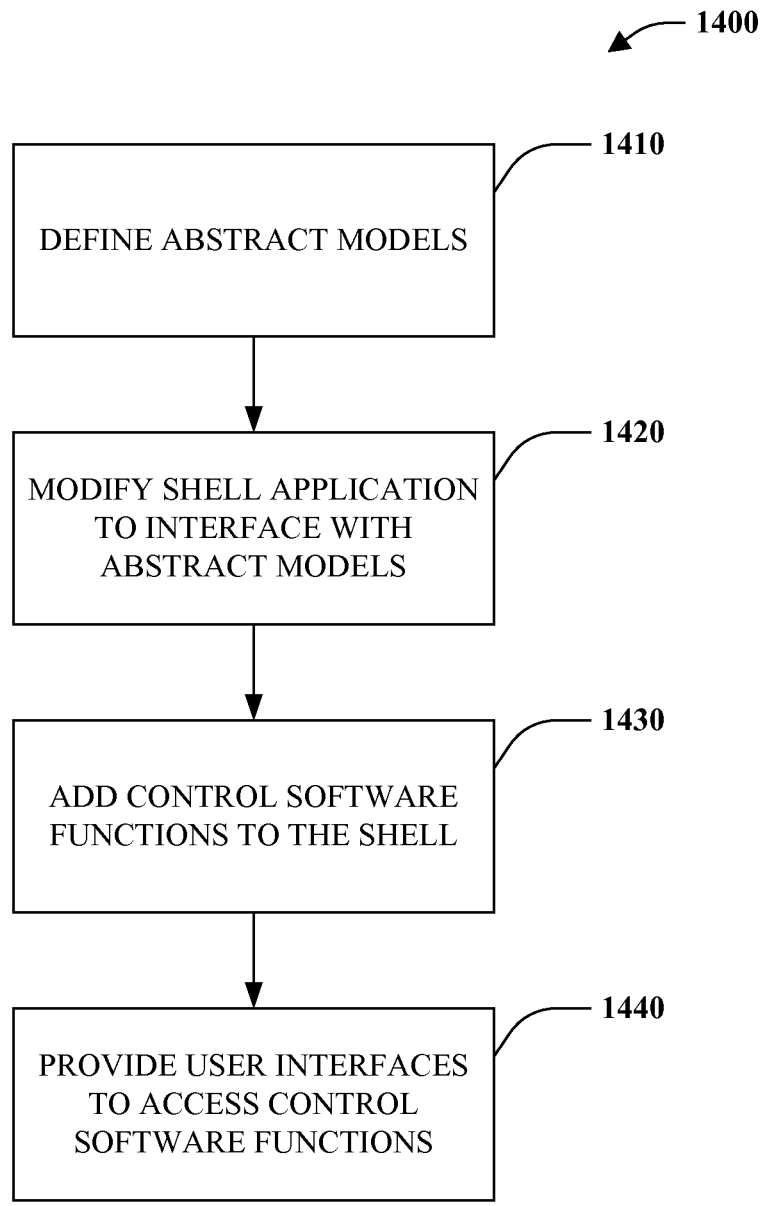
FIG. 14 illustrates a flow diagram that illustrates a process for utilizing a shell application with abstract models.

FIG. 14 is a flow diagram illustrating a method 1400 for adapting a shell with abstract models for industrial control software development. While, for purposes of simplicity of explanation, the methodology is shown and described as a series of acts, it is to be understood and appreciated that the methodologies are not limited by the order of acts, as some acts may occur in different orders or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology as described herein.

Proceeding to 1410, abstract models are defined. As noted previously, abtract programming models can be provided in an abstract setting while facilitating code deployment and execution on substantially any type of end hardware platform. In one aspect, an Abstract Automation Model (AAM) is derived from common base model solutions. Although any programming standard can be utilized for the underlying model, 61131 and 61499 support a majority of known automation languages in the world today. The AAM defines control structures that represent abstract data objects having properties of a configuration, resource, program, and so forth. As part of a larger framework or development environment, another abstract model is a Concrete Automation Model (CAM) that provides data interfaces associated with the generic data objects and according to a designated project format of differing development environments. At 1420, a design shell is modified to support software development for a control and industrial automation platforms. The shell can be adapted from substantially any type of shell could be constructed from technologies such as UNIX, Java, Linux, and so forth. The shell provides an interface development platform that is tailored to the needs of control systems designers.

At 1430, the shell is adapted for various control software functions that facilitate rapid development, debug, and deployment of control systems solutions. As noted previously, such features include version control components to allow revision control of software and Human machine interface (HMI) support. Other features include a language dictionary and various editors. Device content components are included along with I/O configuration capabilities. Dependency tree support is provided in addition to project comparators, and modification history components. Software debug tools include device views, error outputs, cross references, tracing tools, along with script modules, spy lists, and result search tools. Project controls include import and export capabilities. Library and property configurations are also provided. At 1440, various user interfaces are provided to access the control software functions provided at 1430.

The subject matter as described above includes various exemplary aspects. However, it should be appreciated that it is not possible to describe every conceivable component or methodology for purposes of describing these aspects. One of ordinary skill in the art may recognize that further combinations or permutations may be possible. Various methodologies or architectures may be employed to implement the subject invention, modifications, variations, or equivalents thereof. Accordingly, all such implementations of the aspects described herein are intended to embrace the scope and spirit of subject claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
providing, by a system including a processor, a development interface comprising one or more services or views for constructing a control systems application, wherein the one or more service or views employs an abstract model that interfaces to a plurality of industrial automation programming languages and a common programming language, wherein development interface is configurable between two operating modes:
an isolated mode that configures the one or more services or views for use with a single industrial automation programming language of the plurality of industrial automation programming languages; and
an integrated mode function that configures the one or more services or views for use with the plurality of industrial automation programming languages and the common programming language; and
browsing, by the system, hardware devices in a tree structure, acquiring, by the system, respective direct input and output variable addresses of the hardware devices, and mapping, by the system, the direct input and output variable addresses to symbolic variables;
displaying, by the system, the mapping of the direct input and output variable addresses to symbolic variables; and
debugging, by the system, the control systems application using the abstract model.

2. A system, comprising:
a memory, communicatively coupled to a processor, the memory having stored therein executable instructions, comprising:
a shell component configured to employ an abstract model to provide one or more services or views for development of a control systems application, wherein the abstract model provides interfaces to a plurality of industrial automation programming languages and a common programming language, wherein the shell component further is configurable between two operating modes:
an isolated mode that configures the one or more services or views for use with a single industrial automation programming language of the plurality of industrial automation programming languages; and
an integrated mode function that configures the one or more services or views for use with the plurality of industrial automation programming languages and the common programming language; and
an input output configuration component configured to browse hardware devices in a tree structure, acquire respective direct input and output variable addresses of the hardware devices, and map the direct input and output variable addresses to symbolic variables;
a dictionary view that displays the mapping of the direct input and output variable addresses to symbolic variables; and
a debug component operative with the shell component, wherein the debug component is configured to enable debugging of the control systems application using the abstract model.

3. The system of claim 1, wherein the debug component is further configured to delegate debugging commands to a plurality of Fieldbus protocol instances that delegate back event notifications to the debug component.

4. The system of claim 1, wherein the debugging component is further configured to delegates event notifications to a debug engine.

5. The system of claim 1, wherein the debug component is further configured to processes multiple concurrent resource connections.

6. The system of claim 4, wherein the debug component is further configured to translate breakpoints, stepping commands, and events.

7. The system of claim 1, further comprising a framework component configured with a plurality of loggers to log events from the plurality of industrial automation protocols in a hierarchical log corresponding to a hierarchy of associated industrial automation components.

8. The system of claim 7, wherein a logger inherits properties from an associated industrial automation component.

9. The system of claim 7, wherein the framework component is further configured to receive one or more log filters specifying criteria to employ for excluding events from being logged.

10. The system of claim 1, further comprising a spy list configured to enable setting or displaying variable values.

11. The system of claim 10, wherein the spy list is configured to display short descriptions for instances of variables.

12. The system of claim 10, wherein the spy list is further configured to enable dragging and dropping of variables from a dictionary onto the spy list.

13. A non-transitory computer-readable medium having instructions stored thereon that, in response to execution, cause at least one device to perform operations comprising:
providing an integrated programming environment comprising one or more services or views for constructing a control systems application, wherein the one or more service or views employs an abstract model that interfaces to a plurality of industrial automation programming languages and a common programming language, wherein integrated programming environment is configurable between two operating modes;
an isolated mode that configures the one or more services or views for use with a single industrial automation programming language of the plurality of industrial automation programming languages; and an integrated mode function that configures the one or more services or views for use with the plurality of industrial automation programming languages and the common programming language; and browsing hardware devices in a tree structure, acquiring respective direct input and output variable addresses of the hardware devices, and mapping the direct input and output variable addresses to symbolic variables;

displaying the mapping of the direct input and output variable addresses to symbolic variables; and debugging the control systems application using the abstract model.

* * * * *